July 2, 1940.  A. P. BIXLER  2,206,154
BREAD SLICER
Filed Oct. 28, 1938
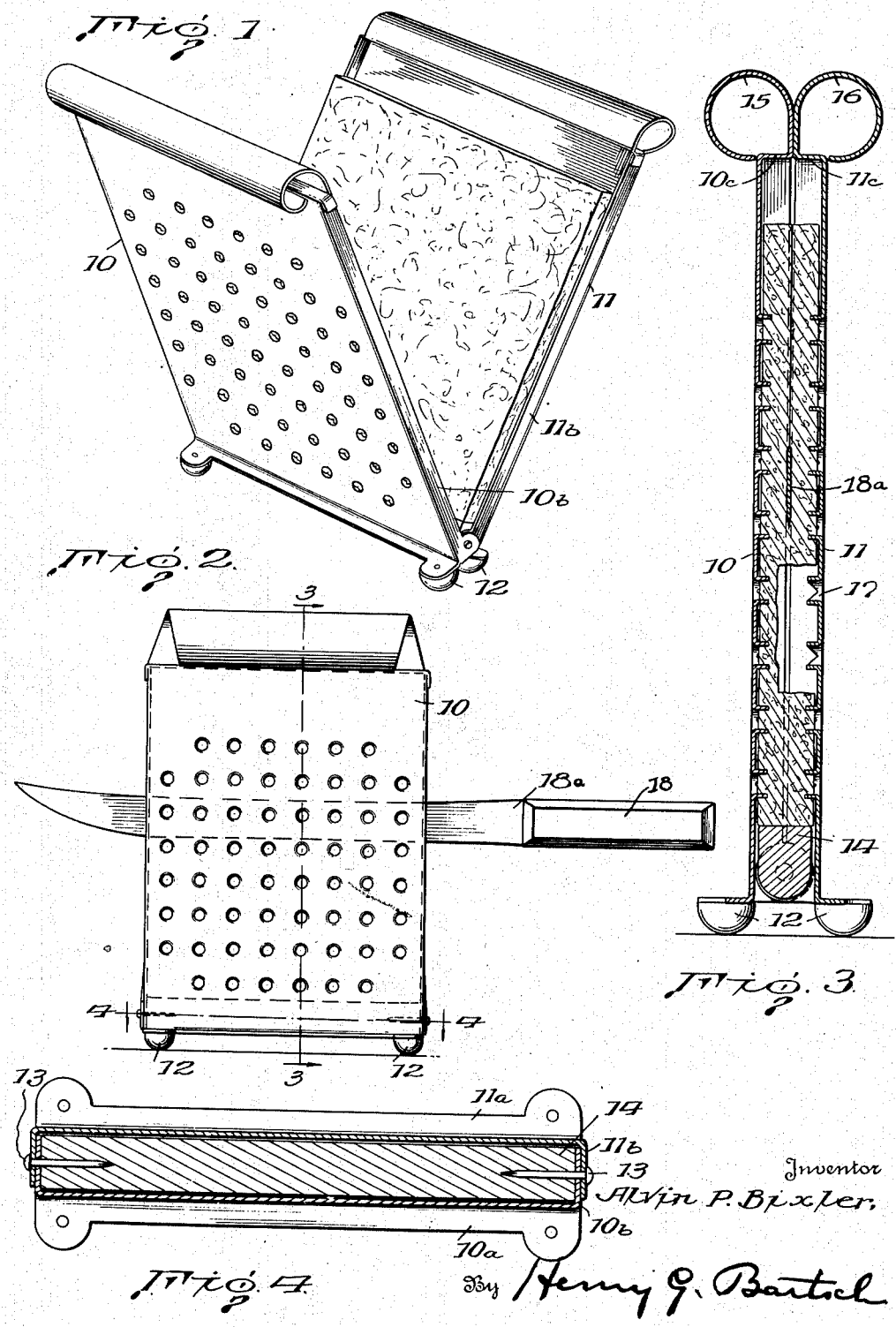
Inventor
Alvin P. Bixler,
By Henry G. Bartich
Attorney Patented July 2, 1940

2,206,154

UNITED STATES PATENT OFFICE 2,206,154

BREAD SLICER

Alvin P. Bixler, New Buffalo, Pa.

Application October 28, 1938, Serial No. 237,577

3 Claims. (Cl. 146—150)

My invention relates to improvements in bread slicers and has to do, more particularly, with the provision of a novel device through the use of which bread may be sliced to the thickness of one-quarter of an inch, a thickness recognized as that most desirable for the making of party sandwiches and the like.

The difficulty with which freshly baked bread is sliceable is well known to every housewife and, as a result, it has become increasingly popular to purchase bread in loaves which have been pre-sliced at the bakery. While such sliced bread is entirely satisfactory for the making of toast, heavy sandwiches and for general table use, the thickness of such slices (one-half inch) is so great as to preclude their use for the making of delicate party sandwiches such as served at teas, buffet suppers and like occasions.

Fresh bread is extremely difficult to slice manually, and the slicing of bread for use in such tiny sandwiches constitutes a real problem in the life of every would-be hostess. It is to the solution of this problem that the present invention is directed. Accordingly, it is a primary object of my invention to provide a culinary accessory by which wafer-thin slices of bread may be produced with facility.

Considered from another angle, it is an object of my invention to provide a device through the use of which a conventional slice of bread having a thickness of approximately one-half inch may be split into two slices, each having a thickness of approximately one-quarter of an inch.

It is an object of my invention to provide a device for supporting a conventional slice of bread in such fashion as to permit of its severance into two uncompressed and unbroken slices, each having a thickness one-half that of the original slice.

It is an object of my invention to provide a device for facilitating the splitting of conventional slices of bread into identical, wafer-thin slices by means of a conventional bread knife.

Lastly, it is an object of my invention to provide a device of the type described which is safe to use, inexpensive to manufacture, free from tendency to wear and rugged enough to withstand the abuse to which culinary apparatus is notoriously subject.

Further objects, and objects relating to details and economies of construction and use will more definitely appear to those skilled in the art upon familiarization with the detailed description to follow. In one instance I accomplish the objects of my invention by the means and method set forth in the following specification. My invention is clearly defined in the appended claims. One structure constituting a preferred embodiment of my invention is illustrated in the accompanying drawing forming a part of this specification, in which:

Figure 1 is a perspective view of a bread slicing accessory embodying my invention, said device being shown in open position with a slice of bread of conventional thickness disposed therein;

Fig. 2 is a view, in side elevation, of the same device after its closure and showing the mode in which a bread knife is used therewith to split a conventional bread slice into two ½ thickness slices;

Fig. 3 is an enlarged vertical sectional view of the same device taken on the line 3—3 of Fig. 2, a portion of the interposed bread slice being broken away to reveal the form of the impaling members upon which it is supported against distortion during the cutting operation; and Fig. 4 is an enlarged horizontal sectional view of the same device taken on the line 4—4 of Fig. 2.

The same reference numerals refer to the same parts throughout the several views.

In a broad sense, my invention may be said to find embodiment in a device for supporting a conventional slice of baker's bread, said device consisting of a pair of plate-like members between which the bread slice is lightly clamped, releasable means for maintaining said plate-like members in face-to-face parallelism, means for guiding the blade of a conventional bread knife in a plane parallel to said plate-like members, and means on the surface of at least one of said plate-like members for precluding displacement of the lightly clamped bread slice under the stress of cutting by the thus-guided knife blade. The purpose of the displacement-preventing means is to prevent distortion and tearing of the slice during the splitting operation. Preferably, the displacement-preventing means consists of a multiplicity of inwardly extending lugs or projections which impale the bread slice. Preferably, also, the two plate-like members are coupled together adjacent their lower extremities, by means of a hinge joint, whereby they may be swung apart, book-fashion, for facile insertion of a conventional bread slice and for easy removal of the two wafer-like slices which are produced by the intended operation of the device. In order to protect the edge of the knife blade employed for splitting the bread slice, a block, of wood or similar material, is desirably disposed between the two plates adjacent their lower extremities and constitutes a miniature cutting block. Suitable rubber feet may be provided upon the lower ends of the device for disposing it vertically and protecting the table or other surface upon which it is supported in use.

More specifically, and with reference to the accompanying drawing, my invention may be embodied in a device consisting of a pair of peripherally flanged plate-like members 10 and 11 which jointly define a generally rectangular casing within which a slice of bread of the conventional one-half inch thickness may be snugly clamped. The lower ends of the plate-like members 10 and 11 are outwardly flanged as at 10a and 11a and carry small rubber buttons which serve as supporting feet 12 for the device. The two plate-like members are maintained in assembly by hinge pins 13 extending through the inwardly-extending lateral flanges 10b, 11b thereof adjacent their lower ends. A wood strip 14 is strung upon the hinge pins 13 to constitute a support upon which the lower edge of the bread slice to be split is disposed, as well as a cutting block for the protection of the cutting edge of the conventional bread knife 18 intended to be employed with the device. The upper ends of the two plate-like members are inwardly flanged at 10c and 11c in a manner generally similar to the side flanges 10b, 11b, but to a slightly greater extent, whereby the hinge pins 13 and the top flanges constitute limiting stops for slightly spacing the flanges 10b and 11b to constitute guides for directing cutting movement of the bread knife between the plate-like members. Handle portions 15 and 16 are provided for the plate-like members and consist of tubular extensions of the flanges 10c and 11c.

Inasmuch as fresh bread sliced to a thickness of approximately one-half inch has but little resistance to distortion and fracture, it has been found necessary to provide means on the surfaces of the plate-like members 10 and 11 for rigidly supporting the interposed slice of bread and preventing crushing or tearing thereof during its division into slices of half-thickness. Of several forms of slice-engaging means, those illustrated have been found especially practical, both from the standpoint of cost of manufacture and effectiveness. The illustrated means consist of a multiplicity of inwardly-punched projections 17 of toothed character generally similar to the cutting bosses of a conventional food grater. These slice-engaging toothed projections are uniformly spaced in alined rows upon the inner surface of each of the members 10 and 11 and, by reason of their large number, uniform distribution, and opposing alinement adequately support the clamped slice of bread.

The operation of the illustrated device should be readily understood. The two plate-like members 10 and 11 are first swung apart into open position and a conventional slice of baker's bread is inserted therebetween with its lower edge resting upon the wood block 14. The two handles 15 and 16 are then brought together and the toothed projections 17 are caused to penetrate the faces of the bread slice to a slight extent and insure its resistance to displacement. With the device thus encasing the slice of bread, the rubber feet 12 may be disposed upon any suitable flat surface, such as a table, and the blade 18a of a conventional bread knife 18 may be inserted between the handle portions 15 and 16 and through the encased slice of bread, cutting it into the two thin slices desired. It will be noted that the position of the pins 13 at the lower end of the device and the flanges 10b and 11b at the upper end of the device provide adequate clearance for free movement of the blade 18a.

When the knife blade has been brought to bear upon the protective cutting block 14, it may be withdrawn and the device may again be swung open to permit removal of the two thus-produced wafer-like bread slices and the insertion of a new slice.

It will be seen that there are no wearing parts in my device and that, due to its simple construction, there is nothing to get out of order even though it be subjected to rough treatment. Due to the firm support afforded by the projections 17, there is no tendency for the bread to be bruised or torn and the thin, wafer-like slices obtained will be nearly perfect in texture as the original slice was prior to splitting. The wafer-like slices which may be produced through the use of my device are ideal for cutting into small pieces of various outline employed in the making of tea sandwiches, canapes and the like.

I am aware that various changes in size, form and material may be availed of without departure from the basic concepts of my invention. The formation of the plate-like members, handles and base from but two pieces of light sheet metal is of distinct advantage from the manufacturing standpoint. However, it is obvious that these parts may be made separately and of dissimilar materials suitably assembled. Likewise, it is not an essential of my invention that assembly of the two plate-like members be accomplished by means of the pins 13, since other hinging instrumentalities might be used for the same purpose. Although the illustrated grater-like projections 17 have been found particularly well adapted for holding the bread slice against displacement, corrugations, pins or other friction-enhancing elements might be employed for this purpose. These and other modifications and variations will readily occur to those skilled in the art upon familiarization with the principles of my invention. I, therefore, claim my invention broadly, as indicated by the appended claims.

What I claim is:

1. A device for facilitating the accurate bisection of a conventional slice of baker's loaf bread into two similar slices each of one-half conventional thickness, comprising: a flat sheet-metal plate member adapted to engage one entire face of a conventional slice of bread, a second flat sheet-metal plate member substantially identical in form to said first plate member adapted to engage the entire other face of said bread slice, means for securing said two sheet-metal plate members against lateral and longitudinal relative displacement when juxtaposed upon the bread slice, stop means integral with opposite end portions of said sheet-metal plate members for positively limiting the extent of plate approach to a position of parallelism characterized by a predetermined spacing slightly less than the thickness of the bread slice to be bisected, and bread-knife-guiding means for positively restraining the blade of said knife to a single cutting plane midway between and parallel to the planes of said plate members when parallelly juxtaposed, said knife-guiding means consisting of a flange integral with and lying along each side edge of each plate member substantially from end to end thereof and extending into the space between said plate members a distance equal to one-half said stop-means determined plate spacing minus one-half the thickness of a conventional bread-knife.

2. A device for facilitating the slicing of a conventional slice of bread into two slices of substantially the same thickness, comprising: a pair of substantially identical flat plate members each adapted to engage one entire face of said bread slice, said plates being hinged together adjacent one end margin thereof and having adjacent their other end margins abutments engaging each other when said plates are in parallel relationship, each of said plates having an inwardly directed flange on each side margin thereof of a width slightly less than one half the distance between said plates when said plates are in parallel relationship, the inner edges of said flanges defining, when said abutments are held engaged to hold said plates in parallel relationship, a slot at each side of the device adapted to receive a bread-knife and restrain movement of the blade of such knife to a single cutting plane substantially midway between and parallel to said plate members, and a multiplicity of bread-slice-impaling members distributed upon and extending inwardly from the inner face of one of said plate members a distance materially less than the width of the side-margin flanges of said plate member.

3. A device for facilitating the slicing of a conventional slice of bread into two slices of substantially the same thickness, comprising: a pair of substantially identical flat plate members, each of said plate members having an inwardly directed flange on each side margin thereof, a non-metallic abutment member located between said plates adjacent corresponding end margins thereof, hinge means securing said plates together and to said abutment member adjacent such end margins of said plates and defining a single axis of movement of one plate relative to the other plate, said plates being formed with cooperating abutments adjacent their ends remote from said hinge means which engage each other when said plates are in parallel relationship, the width of said marginal flanges on said plates being such as to define between them a slot at each side of the device adapted to receive a bread-knife when said abutments are engaged, and a multiplicity of bread-slice impaling members distributed upon and extending inwardly from the inner face of one of said plate members a distance materially less than the width of the side-margin flanges of said plate members.

ALVIN P. BIXLER.